L. A. LA FOND.
SUCTION CONTROLLED GOVERNOR.
APPLICATION FILED JULY 17, 1919. RENEWED FEB. 6, 1922.
1,411,735.                                Patented Apr. 4, 1922.
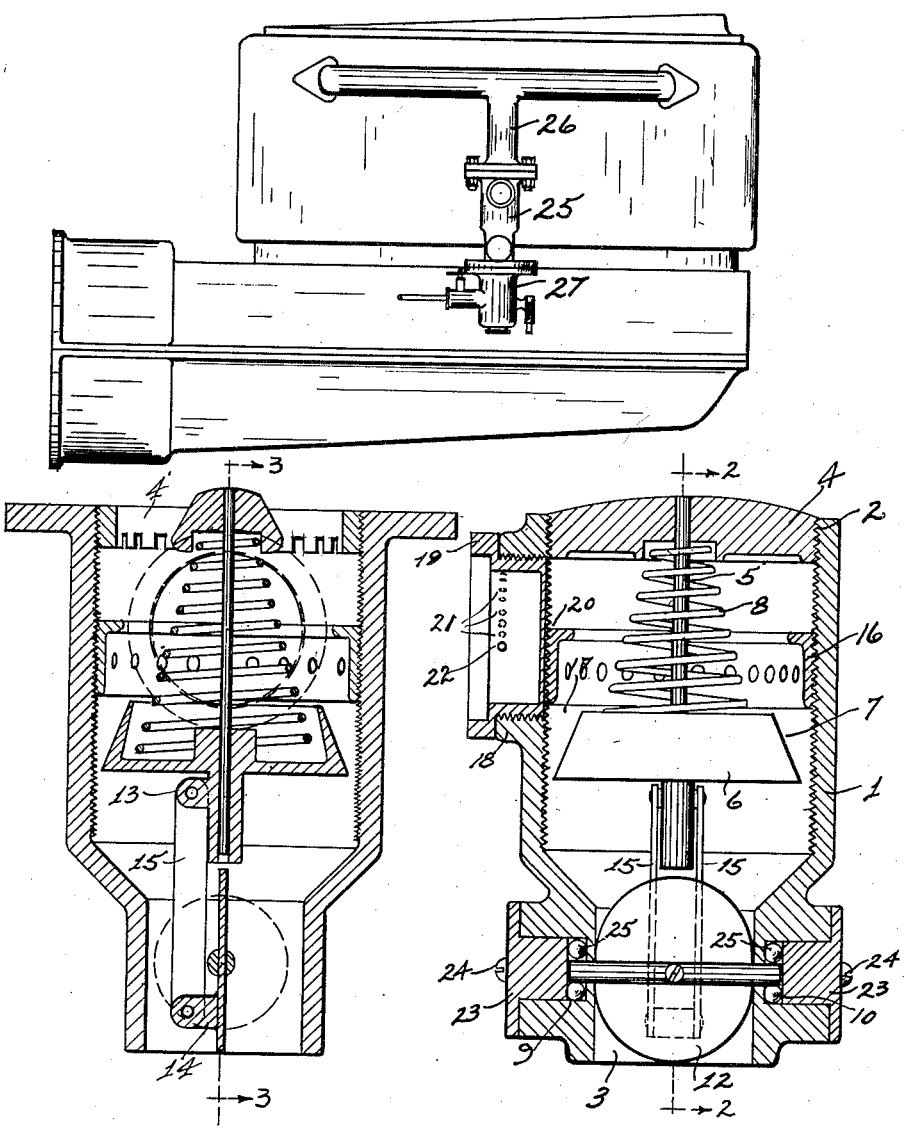

UNITED STATES PATENT OFFICE.

LOUIS A. LA FOND, OF MINNEAPOLIS, MINNESOTA, ASSIGNOR OF FIFTY-ONE PER CENT TO W. G. JORDAN, OF MINNEAPOLIS, MINNESOTA.

SUCTION-CONTROLLED GOVERNOR.

1,411,735. Specification of Letters Patent. Patented Apr. 4, 1922.

Application filed July 17, 1919, Serial No. 311,639. Renewed February 6, 1922. Serial No. 534,590.

*To all whom it may concern:*

Be it known that I, LOUIS A. LA FOND, a citizen of the United States, and a resident of Minneapolis, in the county of Hennepin and State of Minnesota, have invented certain new and useful Improvements in a Suction-Controlled Governor, of which the following is a specification.

One object of my invention is to provide in a suction controlled governor means for adjusting the speed control.

Another object is to provide an improved mounting for a butterfly valve.

Another object is to provide an improved construction of suction plunger of butterfly valve and connection between the valve and plunger.

Another object is to provide an improved means of locking and sealing the adjustment of the governor.

With these and incidental objects in view, the invention consists of certain novel features of construction and combination of parts, the essential elements of which are hereinafter described with reference to the drawing which accompanies and forms a part of this specification.

In the drawing, Figure 1 is a side elevation of an engine showing my improved governor applied thereto; Figure 2 is a section taken on the line 2—2, Figure 3; and Figure 3 is a section taken on the line 3—3, Figure 2.

The governor is composed of a housing 1 having an interior threaded opening 2 and disposed at the opposite end thereof an intake aperture 3.

A cap 4, having apertures 4' therein to allow the passage of combustible mixture therethrough, engages with the threaded opening 2, and a stud 5 is centrally mounted therein.

Slidably mounted on this stud 5 is a plunger 6, the outer surface being cone shaped as at 7, and a spring 8 is provided to normally maintain the plunger 6 in an extended position.

Journalled at 9 and 10 in the housing, and preferably by anti-friction bearings, is a shaft 11 to which is suitably fastened a butterfly valve 12, this valve being so shaped that when turned at substantially 45° to the axis of the housing it will completely close the aperture 3.

A plunger 6 has a boss 13 thereon, and the butterfly valve 12 has a boss 14 thereon, and two links 15 are hinged to these bosses so the slidable movement of the plunger 6 will rotate the butterfly valve 12.

An adjustable sleeve 16 engages with the threaded aperture 2 and by screwing this sleeve in or out the area of the annular space 17 between the sleeve and the conical wall of the plunger can be varied.

The boss 18 extending from the housing 1 is interiorly threaded, and the plug 19 engages therewith, so as to lock at 20 on the sleeve 16, thereby maintaining the longitudinal position of the sleeve as set.

Annularly spaced about the plug 19 are apertures 21, and the aperture 22 in the boss 18 may be registered with one of these plug apertures.

With these apertures so registered, a wire may be passed through the two apertures and a seal placed thereon, so the adjustment of the sleeve 16 which controls the speed at which the governor will handle the engine to which it is applied cannot be varied without breaking the seal.

Plugs 23 fastened to the housing by screws 24 maintain the balls 25 in place and prevent dust from entering the bearings.

With the construction shown and described, it is apparent that when the governor as a whole, represented at 25, Figure 1, is applied between the intake manifold 26 and carburetor 27 the vacuum created in the engine cylinders, drawing the combustible mixture through the carburetor, will maintain the plunger 6 in a certain definite position, and this position will depend upon the vacuum of the cylinders, which in turn will depend upon the speed of the engine.

It is also apparent that if the sleeve 16 is moved in or out longitudinally of the housing 1, the annular area 17 will be varied, and this will vary the effect produced on the plunger 6 by the vacuum produced in the engine cylinders.

While I have described my invention and illustrated it in one particular design, I do not wish it understood that I limit myself to this construction, as it is evident that the application of the invention may be varied in many ways within the scope of the following claim:

In a governor the combination of a housing having a longitudinal aperture therein, one end of which is interiorly threaded, a cap having an aperture therein for the passage of combustible mixture therethrough mounted in said threaded aperture, a stem carried by said cap and extending longitudinally in said housing, a plunger, whose outer wall is conical, slidably mounted on said stem, and means controlled by the slidable movement of said plunger for varying the open area of the end of said housing, opposite that end interiorly threaded, and an adjustable sleeve mounted in said threaded aperture for varying the effective area between the conical surface of said plunger and interior surface of said housing.

LOUIS A. LA FOND.